United States Patent [19]

Bischoff et al.

[11] 3,912,679

[45] Oct. 14, 1975

[54] SELF-POLISHING AGENT FOR SHOES AND OTHER LEATHER ARTICLES SUBJECT TO DISTORTION

[75] Inventors: Edelbert Bischoff, Kirchheimbolanden; Willy Hessler, Weisbaden, both of Germany

[73] Assignee: Werner & Mertz GmbH, Mainz, Germany

[22] Filed: Feb. 20, 1974

[21] Appl. No.: 444,239

Related U.S. Application Data

[63] Continuation of Ser. No. 274,722, July 24, 1972, abandoned.

[52] U.S. Cl...... 260/28.5 R; 117/142; 260/28.5 AV
[51] Int. Cl.$^2$......................................... C08L 91/06
[58] Field of Search ............... 260/28.5 R, 28.5 AV; 117/142

[56] References Cited

UNITED STATES PATENTS

| | | | |
|---|---|---|---|
| 3,647,732 | 3/1972 | Gower et al. | 260/28.5 R |
| 3,666,500 | 5/1972 | Lange et al. | 260/28.5 R |

Primary Examiner—Melvyn I. Marquis
Attorney, Agent, or Firm—Karl F. Ross; Herbert Dubno

[57] ABSTRACT

A self-polishing agent for application to shoes and leather or leather-like articles consists, in terms of a 20% active substances in aqueous medium of a synthetic-resin component in an amount of 5 to 20 parts by weight, a plasticized resin component in an amount of 0.5 to 5 parts by weight and a hard-wax component in an amount of 1 to 10 parts by weight. The synthetic-resin component is introduced into the system in the form of an aqueous dispersion which, upon drying, intermolecularly but reversibly crosslinks and has molecular characteristics, especially as a result of the presence of free carboxyl groups, which makes possible a swelling process at the phase boundary so that the fine droplets of the dispersed synthetic resin have diffuse boundaries. The resin component is introduced in solution and contains a solid plasticizer, especially $\epsilon$-caprolactam while the hard wax is employed in the form of a dispersion and may be microcrystalline parrafin wax, natural (montan) waxes or polyethylene wax.

3 Claims, No Drawings

SELF-POLISHING AGENT FOR SHOES AND OTHER LEATHER ARTICLES SUBJECT TO DISTORTION

This is a continuation of application Ser. No. 274,722, filed July 24, 1972 and now abandoned.

Our present invention relates to self-polishing agents for application to leather and leather-like articles which are to be subjected to considerable distortion, e.g. folding and bending. More particularly, the invention relates to a self-polishing application to shoes and the like which is water and scuff resistant, which requires no mechanical polishing to develop a shine or gloss, and which is sufficiently flexible to tolerate substantial bending.

While self-polishing (self-glossing) floor waxes have been in use for some time, considerable effort has been expended in attempting to develop shoe coating and polishing materials with self-glossing properties, without noticeable success. While a floor finish must be capable of withstanding only compressive distortion and thus is satisfactory if it merely springs back from such compression, a polishing agent applied to shoes, other leather articles or leather-like material subject to considerable wear, must be capable of withstanding substantial bending, repeated flexion and the like. It has not, therefore, been possible to simply employ floor-coating materials, e.g. self-polishing floor coatings, to the coating of shoes and the like.

To date, the only shoe-polishing substances which have found widespread application are those which contain oils, are based upon waxes and are provided in the form of pastes or emulsions. These polishes, however, develop a deep gloss only by mechanical polishing.

The problem of developing self-glossing materials for shoes has been compounded because of the stringent requirements for shoe-polishing materials. For example, the materials must be satisfactory for street-walking shoes as well as boots, for natural leather or synthetic leather-like substances having smooth surfaces as well as substrates having contoured or patterned surfaces, must retain their polishing effectiveness even when large quantities of coloring materials are incorporated in them, must be capable of retaining a high gloss, must adhere tenaciously to the substrate but must be readily removable therefrom, must have little tendency to pick up contaminants, must be highly flexible and yet tough and resistant to scuffing, and must be water-resistant although permitting the diffusion of vapor therethrough.

For the most part, existing floor-polishing materials are incapable of fulfilling most, if not all, of the above requirements. While they are resistant to compressive stresses and have high restoration power, they cannot suffer significant flexure, have limited tensile strength and are insufficiently permeable to gases. Conventional shoe-polishing waxes, moreover, are sensitive to scuffing, pick up dirt readily and cannot be easily removed.

Thus efforts to apply floor-wax technology to leather and leather-like articles which are highly flexible and are subject to other than compressive wear, have not been successful heretofore. Indeed, the art has long sought a self-polishing or self-glossing coating material for leather and like substrates which is nontacky, nonpeeling, soil-resistant, removable and adherent wile retaining high flexibility. The lack of success in this search has led many to believe that a technologically and economically satisfactory self-polishing shoe coating material could not be achieved.

It is the principal object of the present invention to provide an improved protective coating material for shoes and other leather or leather-like substrates requiring high flexibility and abrasion resistance which avoids the disadvantages of conventional shoe polishing materials and yet is of the self-polishing type.

Still another object of this invention is the provision of a self-polishing shoe-coating material which has high adhesion, is vapor-permeable, is scuff and abrasion resistant yet readily removable, is highly flexible and tough, is dirt resistant and is free from the disadvantages of earlier shoe-coating polishing materials.

These objects and others which will become apparent hereinafter are attained, in accordance with the present invention, with a shoe-polishing agent which is the result of a 10-year research project and, while making use of technology developed in the floor-polishing art, has yielded a self-polishing or self-glossing agent for shoes, leather and leather-like articles generally which is far superior to any known shoe polish.

The composition of the present invention which, upon drying, has high flexibility and adhesion to substrates which are to be subjected to sharp shape changes, e.g. bending, folding and twisting, especially leather and leather-like articles used for shoes, consists of a combination of three essential components which have already been suggested individually for floor-coating materials. The three essential components of the present invention are:

a. An aqueous synthetic-resin dispersion component which, upon drying, intermolecularly but reversibly crosslinks and has molecular characteristics — attributed to the presence of free acid or carboxyl groups — which enables a swelling process to take place at the phase boundary;

b. a plasticized-resin component consisting of a resin solution in combination with a solid plasticizer or softener in a proportion and of a type sufficient to impart flexibility but without simultaneously rendering the structure brittle or tacky, elastic or plastically deformable; and c. a hard-wax dispersion.

Surprisingly, this combination of three quite different, although known, components yields a combined effect which is not expected or not predictable from the charateristics of any one of them. The new composition, when applied to substrates which are subject to strong deformation, possesses all of the advantageous desiderata set forth above for an optimum shoe-polishing material. In every respect, the product is superior to the oil-containing pastes or emulsions, to the wax-based shoe-polishing preparations and to conventional self-polishing floor-treating preparations when the latter are applied to distortable substrates.

More particularly, the dry composition is highly adherent to the substrate and abrasive resistant, although it can be removed with ease as described below; it is self-polishing or self-glossing and retains the self-polishing property without mechanical buffing over long periods exceeding the useful life of existing polishing materials. The dry composition or film is permeable to vapors and thus enables the shoe to "breathe" although it is water and dirt resistant, and is highly tough or resistant to distortion without discoloring or flaking even under heavy use. It can be successfully applied to all presently known leathers and leather-like materials (synthetic leathers), does not transfer color to bodies coming in contact therewith, retains its properties even when large proportions of pigments are incorporated therein, and is capable of passing satisfactorily all of the rigorous tests to which shoe-coating materials are subject, in a manner exceeding the test results obtained with wax-base shoe preparations and floor-polishing preparations.

The individual components are described in greater detail below.

SYNTHETIC RESIN DISPERSION COMPONENT

As stated, the synthetic-resin dispersion component is an aqueous synthetic-resin dispersion containing available carboxyl or acid groups. Upon drying, the synthetic-resin dispersion reversibly cross-links and has phase boundaries which are of a diffuse type. Preferably, the synthetic-resin dispersion includes particles having an acrylate base in an aqueous medium and may include a plasticizer.

The synthetic resin dispersion according to the present invention has optimal characteristics when the emulsion droplets are as small as possible and, by swelling in an alkaline medium, can have its surface characteristics so altered that the boundaries are more or less diffuse. The emulsion should be visibly clear, preferably transparent, and may consist of synthetic-resin emulsions which have, in recent times, received commercial attention in so-called clear polishes for floor polising purposes. Such synthetic-resin dispersions are described, for example, in the following publications: Gower and Ross, Clear Floor Polishes Incorporating SMA Resins, WPI/30, Detergent Age, 1968–1969; Technical Information Bulletin "NEOCRYL KW-2" (Bulletin GN-102 A), Polyvinylchemie, Wallquijk, Holland, March 1969; Technical Bulletin "Rhoplex B-505" (identical with "Primal B-505") EX-W-56, issued by Rohm & Haas, Philadelphia, June 1968; and Jehman and Zdanowski, Water-Clear Detergent Resistant Floor Polishes, Soap and Chemical Specialties, February 1969, page 41.

The synthetic-resin dispersion should be so selected that, upon drying, it is additionally cross-linked, the cross-linking being reversible and enabling resolubilization. This technique has been developed for floor-polishing purposes and is described in the Technical Information Bulletins of the firms Polyvinylchemie and Rohm & Haas set forth above and in Gower and Marion, et al. Metal Complex Detergent Resistant Floor Polishes, Chemical Specialties Manufacturers Association, 53rd Mid-Year Meeting, May 1967.

This effect is generally obtained by incorporating in the synthetic-resin dispersion molecules reactive groups capable of combining with so-called bridge-building (bridging) components. The reactive components are generally carboxyl groups and the bridging elements are usually polyvalent metal ions. The solution of the intermolecular compound takes place by complex formation at the metal, e.g. with ammonia, whereby the resulting metal-ammonia complex is stabler than the intermolacular bridges formed ruing drying. The metal is preferably zinc (Zn) or zirconium (Zr).

PLASTICIZED-RESIN COMPONENT

As noted, the resin component is a solution of a resin containing a plasticizer of a type and in an amount sufficient for optimum film formation. The term "optimum formation" means, for the purposes of the present application, the formation of a clear, neither brittle nor tacky flexible film which is neither plastic nor elastic although it is highly flexible and capable of following the distortion of the substrate. It has been found that the desired combination of the resin and plasticizer can be easily determined with a minimum of experimentation and that the resin/plasticizer combination is essential in the composition of the instant invention. In other words, without the resin/plasticizer combination, whether the plasticizer or the resin are present alone or not, the composition does not possess the desirable properties required for use as a self-polishing shoe-treating preparation.

It has been found, more specifically, that the solid plasticizer $\epsilon$-caprolactam fulfills the requirements of the present invention especially well. While this compound has been described as a plasticizer for the production of floor-polishing materials (see the aforementioned publication of Gower and Ross and Poss, Lanis et al., Caprolactam in Floor Polishes, Soap and Chemical Specialties, January 1969, page 84), it is indeed surprising that it must be combined with a resin component to provide the desired flexibility and is not effective in the absence of this component.

HARD-WAX DISPERSION COMPONENT

The hard-wax dispersion is an emulsified hard wax selected from the group which consists of micrycrystalline paraffin wax, natural wax (montan wax), and polyethylene wax.

AUXILIARY COMPONENTS

Aside from the three components described above, whose presence in the composition is critical and each of which is essential, the composition may include auxiliary components, additives or the like imparting other properties to the composition. These auxiliary components or additives include pigments or dyestuffs, and agents for controlling the hydrophilic character of the product. It has been found that the desired removability of the polishing agent, which is achieved in principle by a complex formation overriding the intermolecular cross-linking, can be improved by the incorporation of hydrophilic substances of permanent hydrophilic character, e.g. ethylene oxide adducts to nonpolar hydrocarbons, without materially reducing the water resistance of the film.

PROPORTIONS OF THE COMPONENTS

The several components are combined in the composition according to the present invention, in the following amounts, based on a 20% effective amount of the composition, in an aqueous medium, as follows:
   a. Reversibly cross-linking metal-containing synthetic resin — 5 to 20 parts by weight; preferably 7 to 13 parts by weight;
   b. Resin — 0.5 parts by weight, preferably 1 to 2 parts by weight;
   c. Wax — 1 to 10 parts by weight, preferably 2 to 5 parts by weight.

The resin component, as noted, includes a solid plasticizer, especially ε-caprolactam, in an amount of 0.5 to 1.5 parts by weight per part by weight of the resin, preferably 1 part by weight of ε-caprolactam for each part by weight of the resin.

The foregoing proportions have been found to be critical to the composition of the present invention.

Other additives or auxiliary components may be present as noted above and these may include the following:

| Component | Parts by Weight | |
|---|---|---|
| | Range | Preferred |
| Nonionic emulsifier | 0.5 – 4 | 1 – 2 |
| Temporary plasticizer | 0.5 – 4 | 1 – 2 |
| Ammonia solution (30%) | 0.5 – 4 | 1 – 2 |
| Fluorinated surface-active agent (1% solution) | 0.5 – 3 | 0.75 – 1.5 |
| Silicone Defoamer | 0.05 – 0.3 | 0.1 – 0.2. |

The composition may contain, including the solid plasticizer (ε-caprolactam) a quantity of 1 to 7 parts by weight of permanent plasticizers, preferably an amount of 2 to 5 parts by weight thereof.

STARTING MATERIALS FOR FORMING THE COMPOSITION (Specific Examples)

The following commercial starting materials can be used in accordance with the present invention:

a. Basic material for the synthetic dispersion:

Acrylate copolymers and/or co- and mixed polymers with monomers selected from the group which consist of acrylic acid, methacrylic acid, methyl ester, methacrylic acid-ethylester, methacrylic acid-butyl ester, acrilonitrile, acrylamine, methacrylic acid and styrene.

The following commercially available synthetic-resin dispersions are preferred:

Neocryl KW 32, a product of polyvinylchemie, Wallquijk, Holland, described in Bulletin GN-102. This synthetic-resin dispersion is a dispersion of an acrylic polymer chemically bound to metal and available in the form of a transparent emulsion, i.e. a finely divided alkali-swellable dispersion with a solids content of 40 = 1%, a pH of 7.5 to 8.5, and a density of 1.005.

Primal B-505 (Rhoplex B-505), a product of Rohm and Haas, Philadelphia, and described in Technical Bulletin EX-W-56 of June 1968. This acrylate based synthetic resin dispersion, containing chemically bound metal (zinc content about 0.8%) has a milk-like cloudiness prior to the addition of alkaline (ammonia), a solids content of 40 ±0.5%, a pH of 7.5 to 8.5 and a minimum film forming temperature of 65° C. It is an anionic emulsion. In practice, the Primal B-505 or Rhoplex B-505 is the preferred synthetic-resin dispersion.

b. For the plasticiser of the dispersed synthetic resin

1. Phthalic Acid-Dibutyl Ester:
PALATINOL C, a product of Badische Anilin & Sodafabrik, Ludwigshafen, Germany.

2. Tributoxyethylphosphate:
KP 140, a product of FMC- Corp., New York, or ETIGNAL TP, BASF, Ludwigshafen, Germany.

The preferred plasticizer is tributoxyethylphosphate for the synthetic-resin component.

c. For the Resin Component

In general, styrene-maleic acid anhydride synthetic resins (SMA) having a relatively molecular weight between 1500 and 3000, preferably an average molecular weight of about 2000 and an average acid titer of 200 – 300. Suitable resins of this type include:

1. SMA-Resin 3000 A of Sinclair Petrochemicals, Inc., New York, N.Y., described in Research Bulletin 519 and constituting a styrene/maleic acid anhydride copolymer with a melting point range of 115° – 130° C, an acid titer of about 275, and average molecular weight of 1900 and a density of 1.21.

2. SMA-Resin 2625, a product of Sinclair Petrochemicals, Inc., New York, N.Y., described in Application Bulletin 204 (SMA-resins data) and constituting a styrene/maleic anhydride copolymer with a melting point range of 135°–150° C, an acid titer of about 220, an average molecular weight of 1900 and a density of 1.25. The ratio of styrene to maleic anhydride is, in the case of SMA 3000 A about 3:1 and in the case of SMA 2625 about 2:1.

d. For the Plasticizer of the Plasticized-Resin Component:

ε caprolactam is preferred (see Caprolactam in Floor Polishes, Soap and Chemical Specialties, January 1969, page 84). The caprolactam, has the empirical formula $C_6H_{11}ON$, molecular weight 113.16, density 80° C of 1.0135, viscosity at 80° C of 8.52cp, melting point of 69.2° C and solubility in water at 20° C of 82 g/100 of water, and can be obtained from BASF, Ludwigshafen, Germany, or Allied Chemical Corp., Morristown, N.Y.

The SMA-type resins are combined with caprolactam plasticizers in accordance with the following considerations:

When SMA-resin 3000 A in an amount of 10g in a 15% solution (corresponding to 1.5g of resin) is plasticized with 0.5 g of caprolactam in an 82% solution, a brittle film is obtained. With 1.0 g of the caprolactam, the film is found to have incibient flexibility and with a plasticizer quantity of 1.5 g (corresponding to a weight ratio of resin to caprolactam of 1:1) a clear flexible film is obtained. When 2.0 g of the caprolactam is used, the film has noticeable elasticity and becomes somewhat more plastic with a quantity of 3.0 g of the plasticizer. At this point, excessive plasticization is observed. When the SMA-resin 2625 A is used, 10 g of a 20% solution corresponding to 2.0 g of resin can be plasticized with an 82% solution of caprolactam. Tests show that a 1:1 weight proportion of resin to plasticizer yields the optimal film-forming characteristics, smaller quantities increasing the brittleness and layer quantities of plasticizer rendering the film cloudy and plastic. Tests with other plasticizers have shown that many cannot be used for the purposes of the present invention. For example, with pyrrolidine at low proportions, only brittles films are obtained and with higher proportions only tacky films are obtained, an intermediate condition of optimal flexible film characteristics being entirely absent.

e. For the Hard-Wax Component:

1. Emulsion-polymerized polyethylene such as POLIGEN PE manufactured by BASF, with a density of 0.970, a pH between 9 and 10, a solids content of about 37%, transparency of 83 - 87 and a melting point range of the polyethylene between 140 - 160°C. This emulsion is introduced directly into the shoe polish composition of the present invention.

2. PETROLITE 246 as described in the Technical Service Bulletin "PETROLITE 246" of 10 May 1969 issued by Petrolite Corp., Bareco Division, Tulsa, Okalahoma. This wax composition has a melting point of 130°C, a gelling point of 96°C, a saponification number of 130, an acid titer of 87 and a pentration of 2 under ASTM D 1321. The wax is emulsified in a composition as follows:

| | |
|---|---|
| Petrolite 246 | 20 parts by weight |
| Triton N 57 — emulsifying agent | 4 parts by weight |
| 25% aqueous ammonia | 3.6 parts by weight |
| water | 72.4 parts by weight |

The wax is melted at a temperature of 115 – 118°C and is added to boiling water which shortly before has been mixed with aqueous ammonia.

Triton N 57 is a nonyl phenoxy polyethoxy ethanol-based ethylene-oxide adduct nonionic emulsifier.

f. Other Additives to the Composition:

1. Nonionic emulsifier, especially nonyl-phenol-polyethylene-glycol ethers containing about 10 ethylene oxide groups per molecule, for example Arkopal N as marketed by Farbwerke Hoechst, Germany.

2. Temporary plasticizers, for example diethylene glycol, monoethylether marketed under the name Carbitol by Union Carbide Corp., New York.

3. Fluorinated carboxylic acid wetting agent (fluorocarbon FC 128 manufactured by MMM Co., St. Paul, Minnesota).

4. Silicone defoamer LE 463 of Brenntag, Mulheim, Germany, or silicone defoamer L of Barlocher, Munich, Germany.

MANUFACTURE

The composition of the present invention is made as follows:

The synthetic-resin emulsion is obtained and combined with water and aqueous ammonia at 70°C whereupon the permanent plasticizer is added.

The resin (of the plasticized resin component) is dissolved in ammoniacal water to a solids content of 10%, this solution being combined with an 80% aqueous solution of the solid plasticizer, caprolactam. The resulting plasticized resin component is then mixed with all of the synthetic-resin dispersion and the wax emulsion is added thereto. The other additives may then be supplied.

A specific example of a suitable composition in percent by weight and grams of a shoe-polishing composition according to the present invention is given below, the components identified by tradename having been defined in terms of their chemical composition previously:

| | | |
|---|---|---|
| Primal B 505 | 22.5% by weight | 9.0 g solids |
| distilled water | 43.4% by weight | — |
| 25% queous ammonia | 1.5% by weight | — |
| IP 140 | 2.25% by weight | 2.25 g solids |
| SMA 2625 A (10%) | 11.2% by weight | 1.12 g solids |
| Caprolactam (80%) | 1.5% by weight | 1.2 g solids |
| Petrolite 246 (20%) | 15.0% by weight | 3.0 g solids |
| Carbito | 1.5% by weight | 1.5 g solids |
| FC 128 (1%) | 1.0% by weight | |
| Silicone defoamer LE 463 | 0.15% by weight | 0.15 g solids |
| | 100.00% | 18.22 g solids |
| Possible: Arkopal N 100 | 1.00% by weight | 1.00 g solids |
| | 101.00% | 19.22 g solids |

When the shoe polish of the foregoing composition is tested, the following advantages are found:

1. Comparison with Conventional Wax or Oil-Based Shoe Polishes a. Mechanical buffing is totally unnecessary, the composition having a high gloss immediately upon drying.

b. The composition is coated rapidly and uniformly onto the substrate and flows thereon in a smooth film. It is applicable to somewhat damp shoes, i.e. shoes which remain moist after being wet in the rain, or which are damp from being cleaned with water.

c. The composition is accepted readily by natural leather and dries in a period up to about one minute. The pores of the leather fill with the material to provide a more or less permanent protective layer thereon.

d. The composition can be applied to shoes previously polished with the same composition in lesser quantity and with increased toughness of the coating. When strongly pigmented polish is used, the color of the coating deepens with successive applications.

e. The polished shoe is water-resistant at least to the extent of oil-based shoe polishes and to a greater extent than with polishes of a wax-oil emulsion type.

f. In spite of its excellent water-repellant character, the composition does not completely seal the leather surface against molecular diffusion of water vapor so that the leather, or synthetic leather (leather-like materials) to which the composition is applied "breathe". The feet remain dry.

g. Soiling of the coating and dirt retentivity is substantially less than with all conventional shoe polishes, dirt adhesion is less and cleaning can be carrried out with less effort.

h. The composition is self-cleaning in the sense that the newly applied polish dissolves the previous coating and, upon drying, leaves a completely renewed film without any noticeable diminution in the gloss. The result is a more rapid polishing process.

i. A complete removal of the previously applied composition can be carried out with the composition itself, the pores of the leather remaining filled with a residue. As a result, the leather is not dried out.

j. The durability of the coating is such that the number of applications may be reduced to 1/5 to 1/10 to that of usually used to maintain a shine.

k. Consumption of the composition is surprisingly small. With a polish containing 15 – 20% solids, approximately 0.35 – 0.4 g is used per pair of shoes so that a 100 ccm of the polish can be used for 250 treatments. The conventional polishes are consumed at about twice the rate.

The product of the present invention can be used for all leather or leather-like materials and articles, including shoes, clothing, handbags and for such synthetic leather like CORFAM, CLARINO and XYLEE. The product may contain large amounts of pigment, e.g. up to 25% of the solids content, and such pigments as carbon black may be used. It may be employed for articles of leather, plastic or leather-like materials which are highly textured or structured or of different colors, e.g. using the clear basic film. Since the product can be diluted freely, excellent coverage is obtained and the composition can be used conveniently as a protective coating for leather articles before they are placed on the market or by a consumer of the leather articles. Flaking or shedding does not occur to any significant extent, the composition when still wet can be cleaned up with water and the dry composition removed by application of the composition itself.

We claim:

1. A composition for the self-gloss polishing of leather and leather-like articles which consists essentially of a hard wax in the form of a microcrystalline paraffin wax in an amount of 1 to 10 parts by weight in terms of the solids of the composition, said hard wax having a melting point of 130°C, a gelling point of 96°C, a saponification number of 130, an acid titer of 87 and a penetration of 2 under ASTM D1321; a styrene-maleic anhydride resin plasticized with epsilon caprolactam in an amount of 0.5 to 5 parts by weight of the solids of the composition; an aqueous synthetic-resin dispersion component, consisting of a styrene-acrylate copolymer intermolecularly reversibly cross-linked by zinc or zirconium in an amount of 5 to 20 parts by weight of the solids of the composition; 0.5 to 4 parts by weight of a non-ionic emulsifier; 0.5 to 4 parts by weight of a temporary plasticizer; 0.5 to 4 parts by weight of an ammonia solution in terms of 30% ammonia; 0.5 to 3 parts by weight of a fluorinated surface-active agent in terms of a 1% solution thereof and 0.05 to 0.3 parts by weight of a silicone defoamer.

2. A composition for the self-gloss polishing of leather and leather-like articles consisting essentially of 5 to 20 parts by weight of a dispersion of a styrene-acrylate copolymer intermolecularly reversibly cross-linked with zinc or zirconium; 0.5 to 5 parts by weight of a styrene-maleic anhydride resin plasticized with epsilon caprolactam; and 1 to 10 parts by weight of a hard wax in the form of a microcrystalline paraffin wax in dispersion, said hard wax having a melting point of 130°C, a gelling point of 96°C, a saponification number of 130, an acid titer of 87 and a penetration of 2 under ASTM D1321.

3. A method of treating leather and leather-like articles, comprising the step of applying thereto a self-glossing polishing composition consisting essentially of 5 to 20 parts by weight of a dispersion of a styrene-acrylate copolymer intermolecularly reversibly cross-linked with zinc or zirconium, 0.5 to 5 parts by weight of a styrene-maleic anhydride resin plasticized with epsilon caprolactam; and 1 to 10 parts by weight of a hard wax in the form of a microcrystalline paraffin wax in dispersion, said hard wax having a melting point of 130°C, a gelling point of 96°C, a saponification number of 130, an acid titer of 87 and a penetration of 2 under ASTM D1321.

* * * * *